(12) United States Patent
Wang et al.

(10) Patent No.: US 6,469,697 B2
(45) Date of Patent: *Oct. 22, 2002

(54) DIGITAL ROTARY SWITCH SIGNAL READING CIRCUIT

(75) Inventors: Chris Wang, Tiapei Hsian (TW); Leo Kuan, Taipei (TW)

(73) Assignee: Behavior Tech Computer Corp., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/333,673

(22) Filed: Jun. 16, 1999

(65) Prior Publication Data

US 2002/0044139 A1 Apr. 18, 2002

(51) Int. Cl.⁷ .................................................. G09G 5/00
(52) U.S. Cl. ....................................................... 345/184
(58) Field of Search ................................ 345/184, 173, 345/170, 172; 341/22, 35, 192; 200/179

(56) References Cited

U.S. PATENT DOCUMENTS 4,633,227 A * 12/1986 Menn ........................... 341/22
5,151,873 A * 9/1992 Hirsh ........................... 708/172
5,572,239 A * 11/1996 Jaeger ......................... 345/172
5,712,661 A * 1/1998 Jaeger ......................... 345/170
5,717,430 A * 2/1998 Copland et al. ............. 345/168
5,774,075 A * 6/1998 Palalu et al. .................. 341/35
5,786,811 A * 7/1998 Jaeger ......................... 345/172

OTHER PUBLICATIONS

HP multimedia keyboard by Hewlett Packard.*

* cited by examiner

*Primary Examiner*—Richard Hjerpe
*Assistant Examiner*—Ronald Laneau
(74) *Attorney, Agent, or Firm*—Rosenberg, Klein & Lee

(57) ABSTRACT

A digital rotary switch signal reading circuit is adapted to read volume control signal from a volume control knob mounted on a multi-medium keyboard. The rotary switch has two signal terminals and one common terminal. The signal terminals are connected to two of input pins of a microprocessor of the keyboard and the common terminal is connected to one of the output pins of the microprocessor, the input pins and the output pins being interconnected with each other to form a key array. Thus, the signal from the rotary switch may be read by the computer in the same way as key actuation signal from the key array.

1 Claim, 4 Drawing Sheets

DIGITAL ROTARY SWITCH SIGNAL READING CIRCUIT

FIELD OF THE INVENTION

The present invention generally relates to a circuit for reading signal from a digital rotary switch, and in particular to a circuit for reading signal from a rotary switch type volume knob mounted on a multi-medium keyboard of a computer.

BACKGROUND OF THE INVENTION

A keyboard is a commonly used input device for computers or other processor-based electronic devices. There are a variety of keyboards available in the market suitable for different needs and requirements. A multi-medium keyboard is particularly for use with a multi-medium computer and the associated software. Besides regular keys, the multi-medium keyboard further comprises control means for controlling audio and video output of the computer. For example, the multi-medium keyboard may comprise a volume control knob to be manually turned for controlling the audio output of the computer.

The volume control knob is usually comprised of a digital rotary switch mounted on the keyboard. When rotated, the rotary switch generates two or more pulses at terminals thereof which are applied to a microprocessor-based signal processing circuit of the keyboard. The signal processing circuit calculates a phase difference between the pulse signals for establishing a corresponding volume control signal to be transmitted to a computer.

To read the pulse signals, two pins of the microprocessor have to be exclusively used to receive the pulses. This imposes constraints in designing the circuit of the keyboard. Furthermore, it also hinders reduction of cost of the keyboard circuit.

Thus, it is desired to have a rotary switch signal reading circuit having a simplified circuit configuration for addressing the above problems.

SUMMARY OF THE INVENTION

Accordingly, an object of the present invention is to provide a rotary switch signal reading circuit which are coupled to a key signal reading array of a microprocessor of a keyboard without additional use of pins of the microprocessor thereby simplifying circuit layout and reducing costs thereof.

To achieve the above object, in accordance with the present invention, there is provided a digital rotary switch signal reading circuit adapted to read volume control signal from a volume control knob mounted on a multi-medium keyboard. The rotary switch has two signal terminals and one common terminal. The signal terminals are connected to two of input pins of a microprocessor of the keyboard and the common terminal is connected to one of the output pins of the microprocessor, the input pins and the output pins being interconnected with each other to form a key array. Thus, the signal from the rotary switch may be read by the computer in the same way as key actuation signal from the key array.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
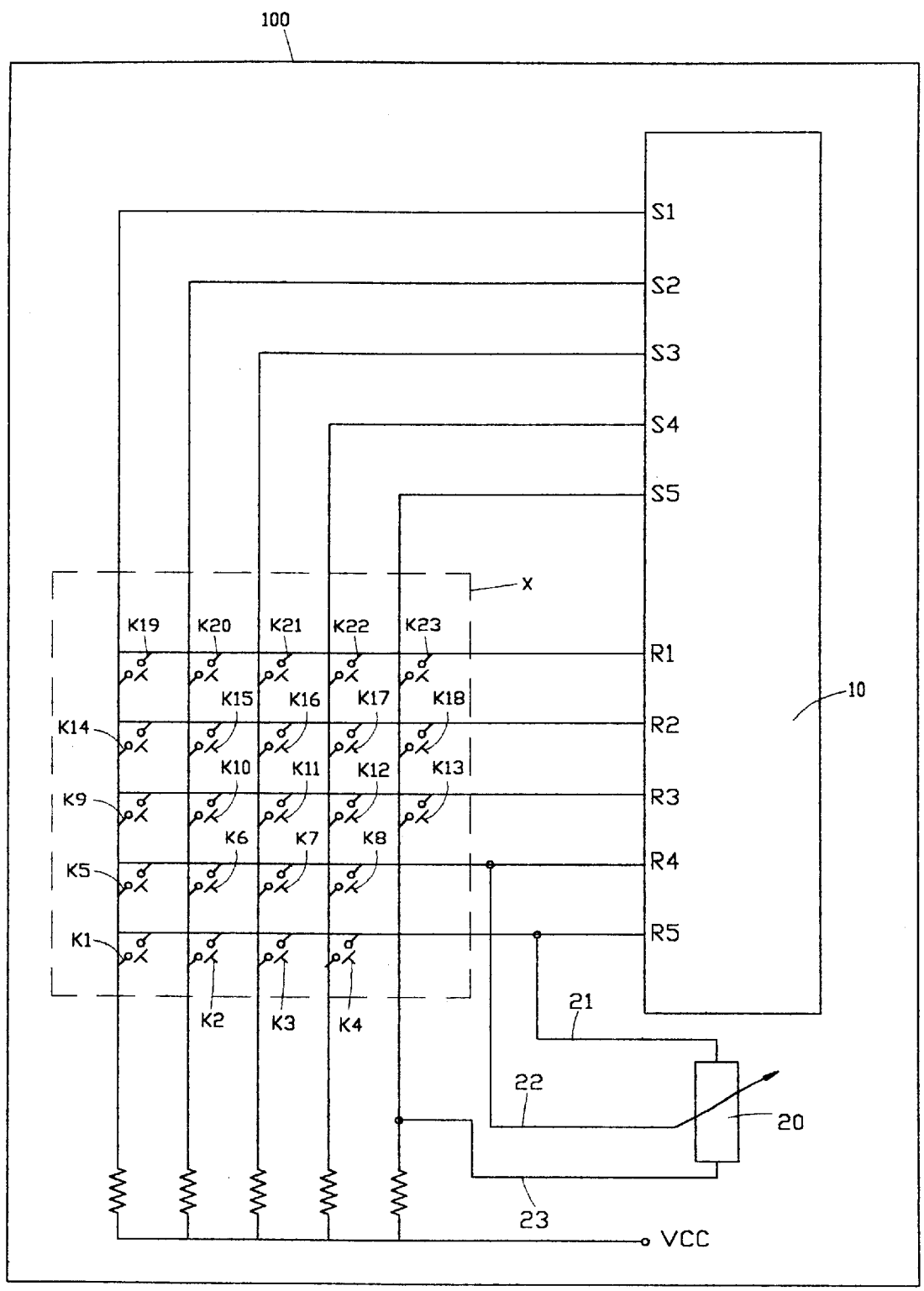
FIG. 1 is a circuit diagram in accordance with a first embodiment of the present invention.

With reference to the drawings and in particular to FIG. 1, wherein a digital rotary switch signal reading circuit of the present invention, generally designated by reference numeral 100, is shown, the circuit 100 comprises at least one microprocessor 10 having an input port and an output port. The input port comprises a plurality of input pins R1–R5 and the output port comprises a plurality of output pins S1–S5. The input and output pins R1–R5 and S1–S5 interconnect each other forming a key signal input array X. A key K1–K23 is connected between each input pin R1–R5 and each output pin S1–S5. A scanning signal generated from the microprocessor 10 is sequentially and repeatedly sent to each output pin S1–S5 whereby when any key K1–K23 is actuated, a returning signal is received by the microprocessor 10 via the input pins R1–R5 and the key is identified and a corresponding signal is encoded by the microprocessor 10 to be transmitted to a computer (not shown).

It should be noted that the number of the input and output pins and the keys are not limited to what is illustrated herein. The embodiment described herein is for illustration only and should not be considered limitative.

Figure 2:
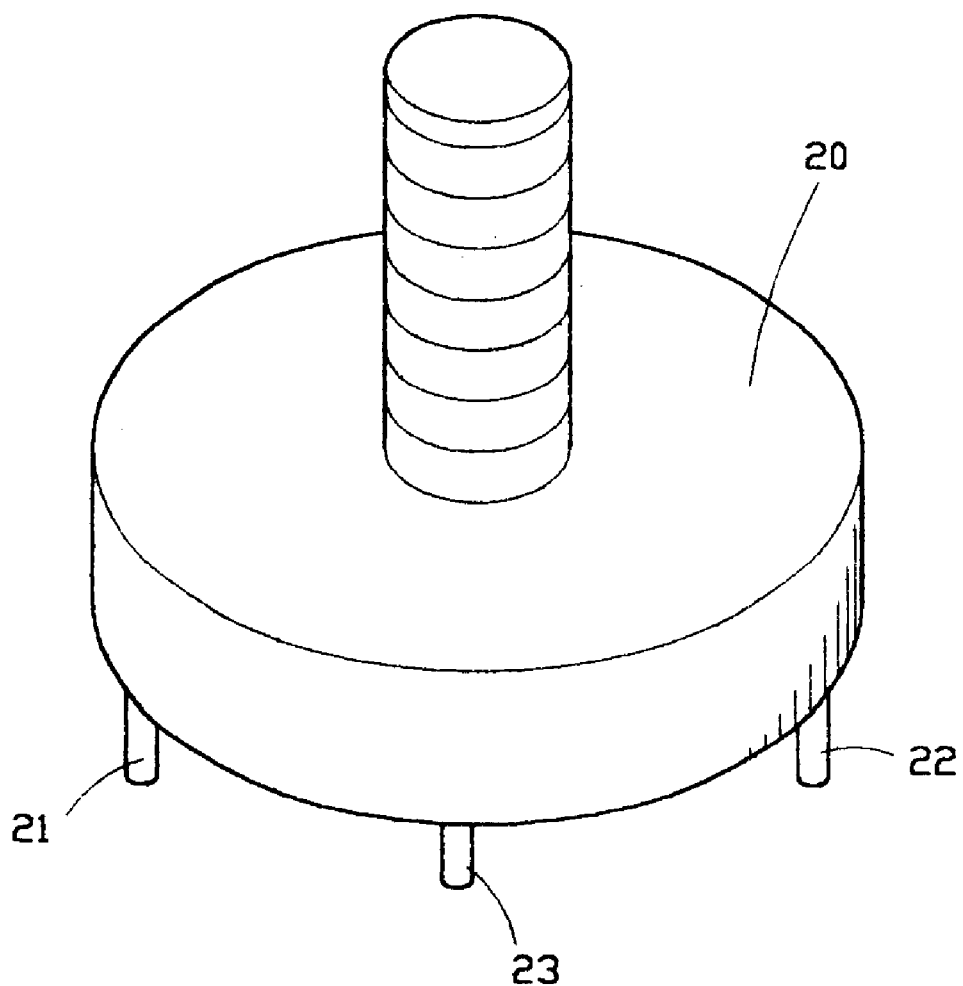
FIG. 2 is a perspective view of a digital rotary switch in accordance with the present invention.

Referring also to FIG. 2, a digital rotary switch 20 comprises at least one pair of signal terminals 21, 22 and a common terminal 23. The signal terminals 21, 22 are respectively connected to two of the input pins R1–R5 of the microprocessor 10 and the common terminal 23 is connected to one of the output pins S1–S5 wherein no keys are arranged between the one of the output pins and the two of the input pins. In the embodiment illustrated, the signal terminals 21, 22 of the rotary switch 20 are connected to the input pins R4, R5 and the common terminal 23 is connected to the output pin S5 and no keys are arranged between the output pin S5 and the input pins R4, R5. This allows signals from the rotary switch 20 to be read in the sane way as the key signals caused by actuation of the keys K1–K23.

Figure 3:
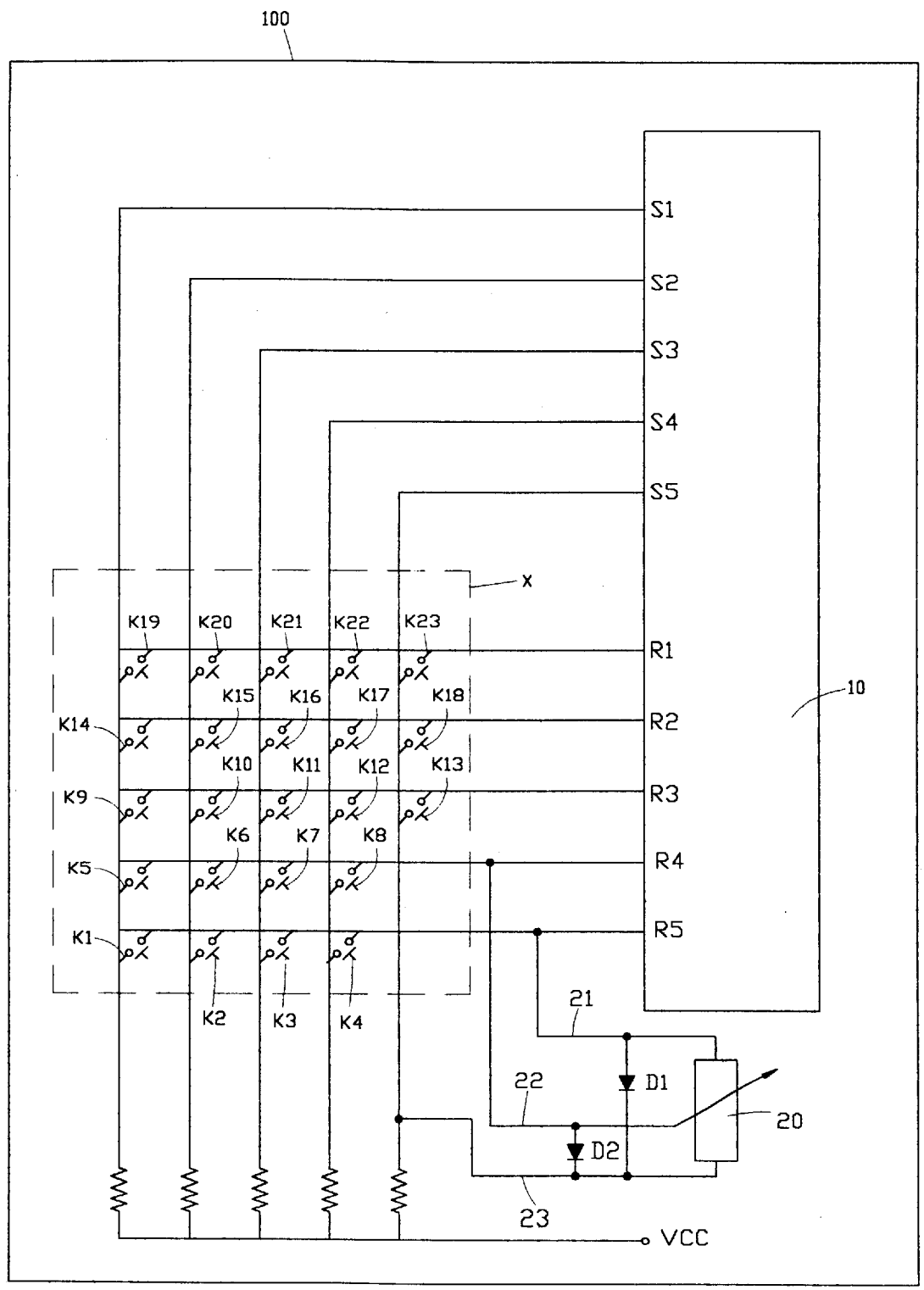
FIG. 3 is a circuit diagram in accordance with a second embodiment of the present invention.

FIG. 3 shows a circuit in accordance with a second embodiment of the present invention. The second embodiment circuit which is also designated by reference numeral 100 for simplicity has a circuit layout similar to that of the first embodiment illustrated in FIG. 1 and diodes D1, D2 are respectively forwardly connected between the signal terminals 21, 22 and the common terminal 23 of the rotary switch 20. The diodes D1, D2 prevent the "phantom key" phenomena due to the situation when the input pins R4, R5 and the output pin S5 are pulled low by means of the actuation of the keys K1–K23 thereby providing a more precise reading of the rotary switch 20.

In the operation of the circuit 100, the output pins S1–S5 serve as scanning lines for transmitting scanning signal, while the input pins R1–R5 serve as returning lines for returning the scanning signal. The returned signal is operated and stored in memory means, such as register, of the microprocessor 10.

Figure 4:
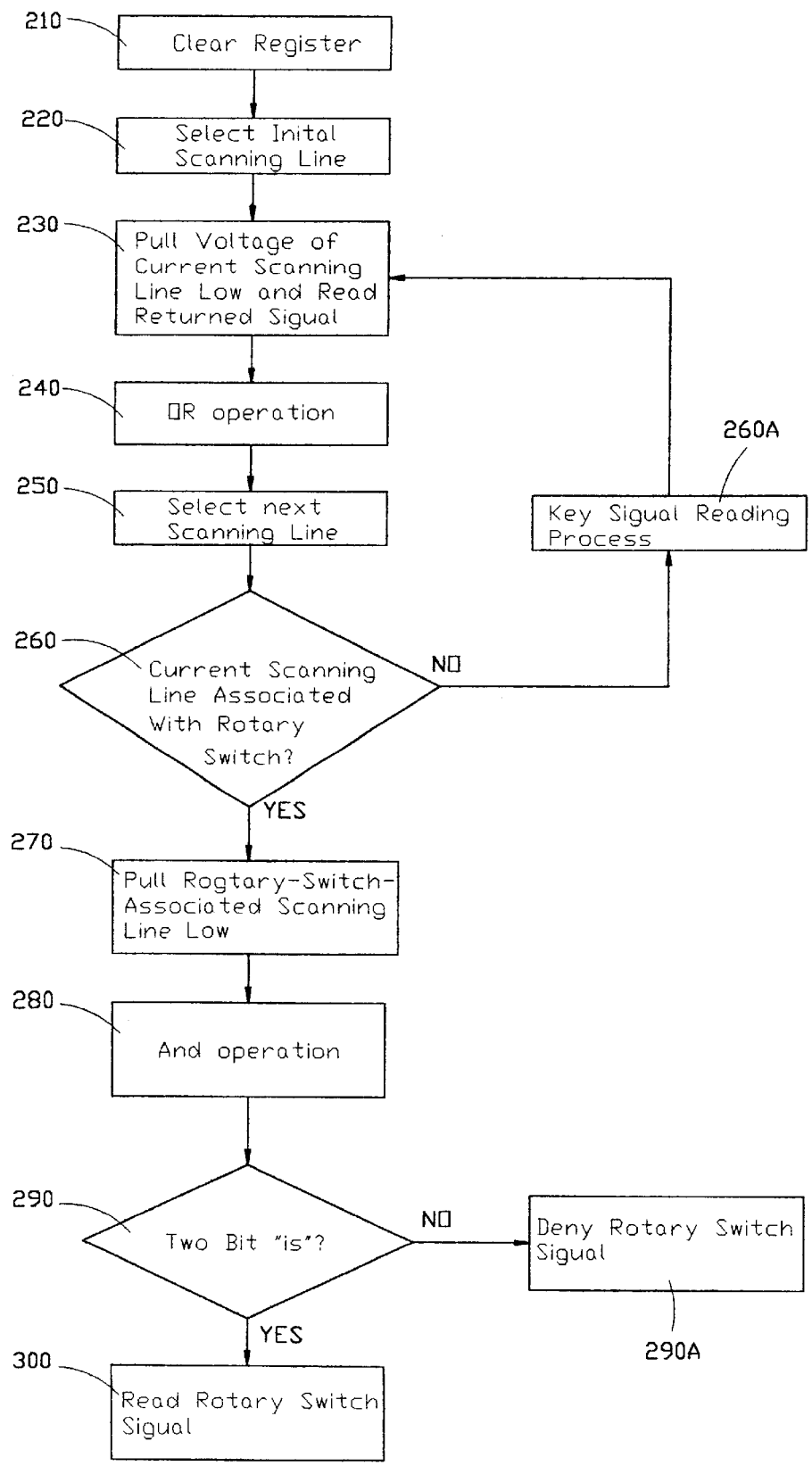
FIG. 4 is a operational flow chart of the digital rotary switch signal reading circuit of the present invention.

FIG. 4 shows an operational flow chart of the circuit 100. In step 210, a register or memory of the microprocessor 10 is cleared or reset first. An initial scanning line is selected from the input pins S1–S5, step 220. Voltage level of the current scanning line is pulled low at step 230 and the returned signal through input pins R1–R5 is read. The returned signal is ORed with contents of the register and the operation result is stored back to the register, step 240. In step 250, a next scanning line is selected. Preferably, the scanning line is selected in sequence. At step 260, it is determined if the current scanning line is associated with the rotary switch 20, namely if it is scanning line S5 in the embodiment illustrated. If it is not, then perform a key signal reading process, step 260A, and go back to step 230. If it is, then pull the voltage level of the rotary-switch-associated scanning line to low and read the returned signal, step 270. Namely, in the embodiment illustrated, the voltage level of input pin S5 is set low and reading the voltage levels of the input pins R4, R5. The input pins R1–R3 are also set low at this moment. The returned signal is ANDed with the contents of the register and the operational result is stored back to the register, step 280. Thereafter, the contents of the register is examined to see if there are two bit "1s", step 290. If there are not, then at step 290A, deny the switch signal from the rotary switch 20 in order to eliminate the phantom key phenomena. If there are two bit "1s", then reading the signals from the signal terminals 21, 22 of the rotary switch 20 to the microprocessor 10, step 300.

The present invention provides a simplified method and configuration for reading signals from a digital rotary switch by combining the reading circuit of the rotary switch signal with the key signal reading circuit which simplifies the circuit layout and reduces the costs.

Although the present invention has been described with respect to preferred embodiments, it is contemplated that a variety of modifications, variations and substitutions may be done without departing from the scope of the present invention that is intended to be defined by the appended claims.

What is claimed is:

1. A keyboard system disposed within a keyboard housing for reading a plurality of key switch signals and signals from a digital rotary switch, comprising:

(a) a key switch input array formed by a plurality of row conductors and a plurality of column conductors;

(b) at least one microprocessor including a plurality of input pins and a plurality of output pins, at least a portion of said input pins being respectively coupled to said plurality of row conductors and at least a portion of said output pins being respectively coupled to said plurality of column conductors, said microprocessor including (i) means for sequential and repeated output of a scanning signal from said portion of said plurality of output pins, and (ii) means for encoding receipt of said scanning signal at said portion of said plurality of input pins to define a set of unique input signals;

(c) a plurality of key switches coupled to said input array, each of said key switches having a first terminal coupled to a respective one of said row conductors and a second terminal coupled to a respective one of said column conductors, wherein a closure of any of said key switches couples a respective output pin of said microprocessor to a corresponding input pin thereof to transfer said scanning signal thereto and thereby define one of said set of unique signals input to said microprocessor; and, (d) at least one digital rotary switch having a common terminal coupled to one of said column conductors and at least a pair of signal terminals coupled respectively to a pair of said row conductors, wherein rotation of said digital rotary switch couples a corresponding one of said output pins of said microprocessor through said common terminal and associated column conductor to said input pins of said microprocessor through said signal terminals and associated row conductors for transferring said scanning signal thereto and thereby define others of said set of unique signals input to said microprocessor and indicative of rotation of said digital rotary switch.

* * * * *